United States Patent [19]
Der Marderosian et al.

[11] 3,926,714

[45] Dec. 16, 1975

[54] METHOD AND APPARATUS FOR PRODUCING FOAMED THERMOPLASTIC INSULATION BOARDS

[75] Inventors: Dikrun Der Marderosian, Sudbury; Paul Albert Tremblay, Billerica, both of Mass.

[73] Assignee: W. R. Grace & Co., Cambridge, Mass.

[22] Filed: June 24, 1974

[21] Appl. No.: 482,141

[52] U.S. Cl. .................. 156/516; 83/5; 156/268; 156/552
[51] Int. Cl.² ........................................ B32B 31/00
[58] Field of Search ........... 156/257, 301, 306, 322, 156/510, 516, 497, 499, 555, 268, 270, 552; 83/5, 171; 425/280, 291, 294; 264/138, 145, 162

[56] References Cited
UNITED STATES PATENTS

| | | | |
|---|---|---|---|
| 362,179 | 5/1887 | Remus | 83/5 |
| 442,878 | 12/1890 | Geiger | 83/5 |
| 667,055 | 1/1901 | Anderson | 83/10 |
| 1,751,549 | 3/1930 | Hope et al. | 83/5 |
| 1,940,106 | 12/1933 | Snyder | 93/58.2 |
| 1,955,395 | 4/1934 | Tueth | 219/21 |
| 1,967,262 | 7/1934 | Robinson et al. | 83/10 |
| 2,157,151 | 5/1939 | Stackhouse | 30/140 |
| 2,335,767 | 11/1943 | Kinports | 425/304 |
| 2,655,190 | 10/1953 | Mason et al. | 83/5 |
| 2,692,328 | 10/1954 | Jaye | 264/138 |
| 2,867,222 | 1/1959 | Otto et al. | 264/321 |
| 2,896,059 | 7/1959 | Ruff | 30/140 |
| 2,991,214 | 7/1961 | Burkholder | 156/301 |
| 3,062,698 | 11/1962 | Aykanian | 156/306 |
| 3,180,778 | 4/1965 | Rinderspacher et al. | 156/311 |
| 3,301,935 | 1/1967 | Stoeckhart | 264/321 |
| 3,309,440 | 3/1967 | Kracht | 264/53 |
| 3,330,174 | 7/1967 | Hazen et al. | 83/4 |
| 3,338,122 | 8/1967 | Lampe | 83/171 |
| 3,491,651 | 1/1970 | Pascoe | 90/11 |
| 3,555,137 | 1/1971 | Carmody | 264/148 |
| 3,610,078 | 10/1971 | Rowlands | 83/16 |
| 3,674,590 | 7/1972 | Holman | 156/252 |
| 3,677,874 | 7/1972 | Sterrett | 156/306 |
| 3,693,253 | 9/1972 | Jager et al. | 83/171 |
| 3,709,094 | 1/1973 | Laux | 90/11 C |
| 3,736,820 | 6/1973 | Jung | 83/4 |
| 3,850,222 | 11/1974 | Lejuene | 83/171 |

FOREIGN PATENTS OR APPLICATIONS
| | | |
|---|---|---|
| 994,393 | 1/1969 | United Kingdom |
| 1,286,260 | 1/1969 | Germany |

*Primary Examiner*—Douglas J. Drummond
*Assistant Examiner*—Michael W. Ball
*Attorney, Agent, or Firm*—C. E. Parker; William L. Baker

[57] ABSTRACT

Shaped, e.g., grooved or channeled, cellular thermoplastic insulation boards are produced in a process wherein the shaping is performed by slicing the board with rotating knives and/or removing a portion of the board with a heated tool having a desired configuration. In a preferred embodiment, insulation boards having surface laminations of flexible sheet material (e.g., paper or plastic film) and shaped in the foregoing manner are produced in a continuous process using discontinuous lengths of board feed-stock material.

3 Claims, 4 Drawing Figures

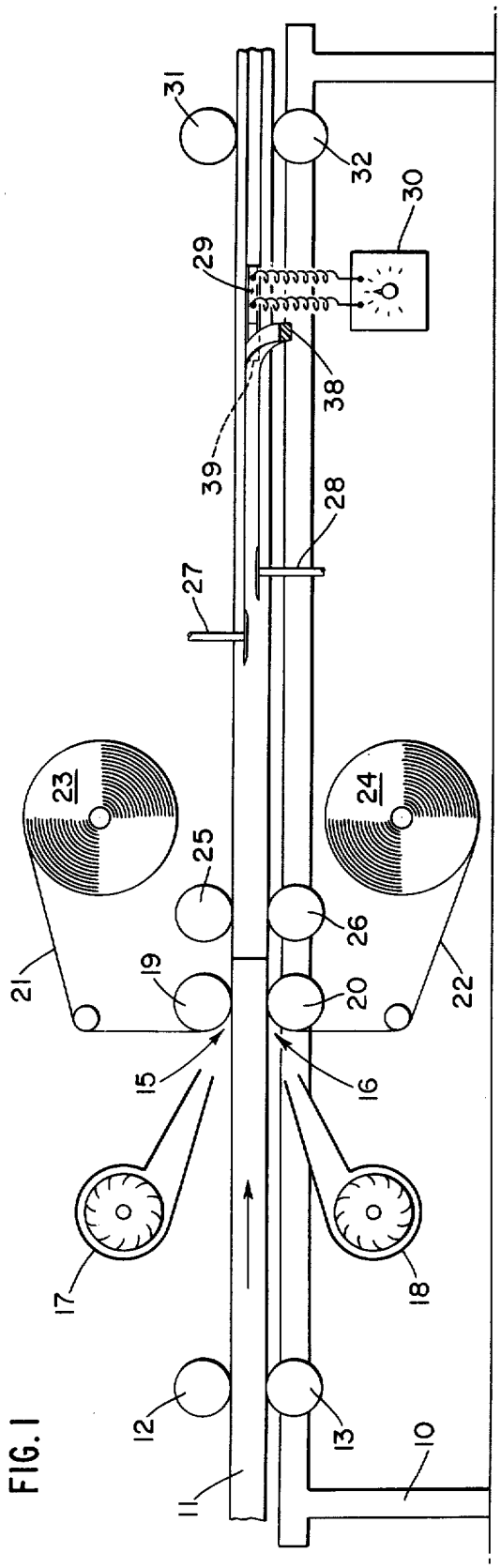
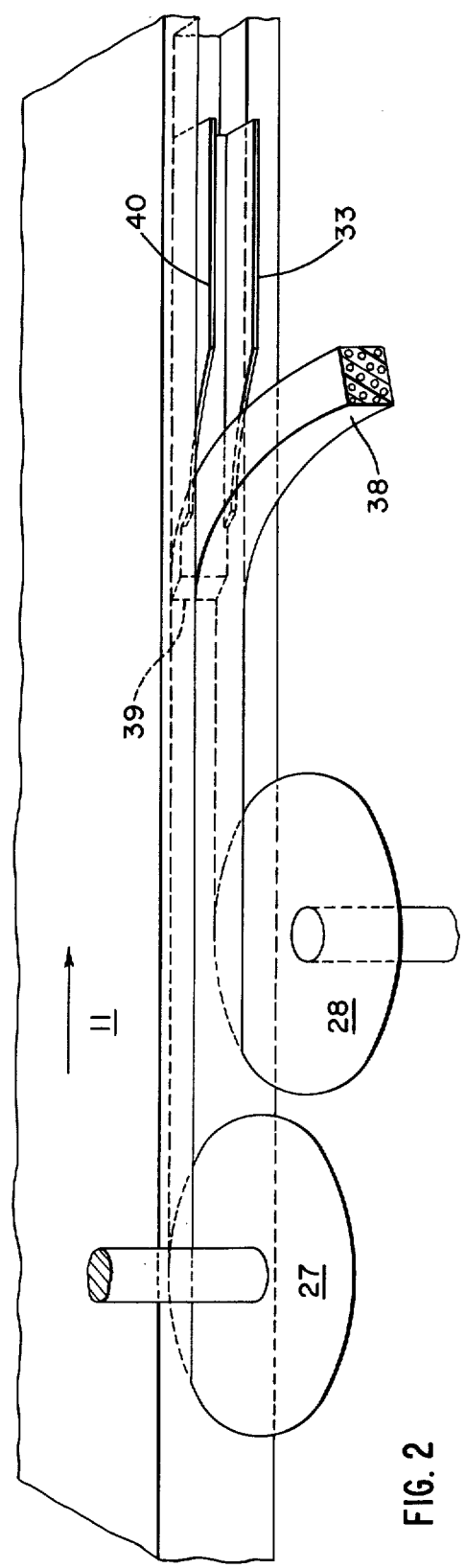

METHOD AND APPARATUS FOR PRODUCING FOAMED THERMOPLASTIC INSULATION BOARDS

This is a division of application Ser. No. 314,685, filed Dec. 13, 1972.

BACKGROUND OF THE INVENTION

This invention relates to the manufacture of insulating boards, especially insulating boards made from cellular thermoplastic materials such as foamed polystyrene.

Insulation boards of cellular plastic material such as cellular polystyrene, polyurethane, etc., have been widely employed as the insulation medium in building and other constructions. Foamed boards prepared by molding expandable particles or beads of a thermoplastic resin such as polystyrene in a closed cavity, often called "bead board", are especially popular. Methods and apparatus for the preparation of such boards have been widely described in the prior art, for instance, in U.S. Pat. Nos. 2,787,809, 3,408,690, 3,594,461 and others. Such methods produce boards having a general block or slab-like configuration.

Further shaping and sizing of the molded blocks requires a cutting operation to be performed. For instance, in ordinary building construction where the board may be used as the insulation for walls and ceilings, a tongue-and grooved board which is applied to the studding or under-surface is commonly used. Insulation boards have also been produced which have grooves or vents cut into certain of their surfaces in order to permit passage of moisture vapor. Such a board is described in U.S. Pat. No. 3,619,961. Grooved or channeled insulation boards have also been produced which are in the form of laminates of cellular thermoplastic polymer core material with surface coverings of, for example, paper, fabrics and cellular or non-cellular synthetic resin. Such laminates are described for example, in U.S. Pat. Nos. 3,619,961 and 3,677,874.

In order to cut or channel the board, some of the material of the original board must be removed. Board formed of expanded polymeric beads has a definite degree of cohesiveness and stability, but due to its particular construction, it does not cut or rout well. The waste bead material breaks up, flies around and sometimes the saws used tear chunks out of the bead board rather than making a neat cut. The cutting or routing operation thus produces many flying particles of the polymeric material which accumulate about the cutting area presenting a bothersome and hazardous situation.

SUMMARY OF THE INVENTION

In the present invention, the cutting and/or channeling of cellular thermoplastic insulation board is accomplished in a manner such that very littly or no waste is generated in a particulate or "dust" form. The cutting is accomplished by the use of thin rotating knives which greatly resemble the rotating blades of a conventional meat slicer. The circumferential edge of the knives employed herein is smooth and continuous, as opposed to the jagged or discontinuous edge of a conventional saw blade. The board is, in effect, sliced rather than sawed by the smooth-edged rotating knives. Portions of the board can be removed by using a pair of such knives positioned to make intersecting cuts in the board. Channeling or routing is accomplished in the present invention with a heated, sharp-edged tool of selected configuration. The temperature and configuration of the tool is selected such that the stock is melted or softened as it is cut by the tool. Stock is removed as a continuous strip and should any individual polymeric particles be produced, they fuse together with, and are removed with the continuous strip. Preferably, channels or grooves are made in the board in the present invention by the use of one or more of the slicing knives in combination with the heated tool. The board is initially sliced by the knife or knives and the area defined by the knife slit or slits is routed out by the heated tool.

In a particularly preferred embodiment of the invention, laminated cellular thermoplastic insulation boards are cut and grooved in the manner described above and surface laminations, such as those described in U.S. Pat. Nos. 3,619,961 and 3,677,874, are applied in the form of a continuous sheet material. The laminates may be adhered using a previously applied adhesive material or the laminations may be adhered by heat-softening the surface of the core material and/or the surface of the lamina to be applied, and thereafter pressing the two together. The application of the surface lamina in the form of a continuous sheet to the upper and lower surfaces of the board makes it possible to employ separate or discontinuous lengths of board as the starting or feed stock material.

BRIEF DESCRIPTION OF THE DRAWINGS

FIG. 1 is a side view of an apparatus performing the aforedescribed process;

FIG. 2 is a detail, in perspective view, of the channel-forming operation shown in FIG. 1;

DESCRIPTION OF THE PREFERRED EMBODIMENT

Figure 3:
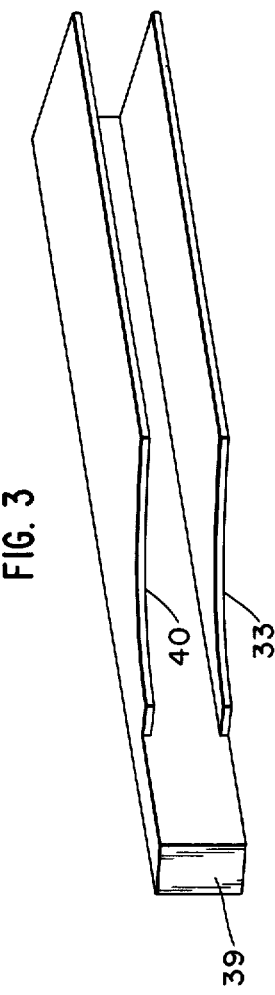
FIG. 3 is a detail, in perspective view, of the heated tool performing the channeling operation.

Referring to FIG. 1 of the drawings, insulation board 11 of expanded polystyrene beads previously molded into a generally rectangular slab by an conventional manner, is introduced to the nip of a pair of drive rolls 12 and 13. Lower rolls, 13, 20, 26 and 32 are suitably supported by frame 10. Upper rolls 12, 19, 25 and 31 may be supported by an extension of such frame (not shown) as may be upper heater 17, upper laminate supply roll 23 and upper knife 27. Drive rolls 12 and 13 direct the board to a lamination area where a continuous sheet 21 of laminating material is unwound from supply roll 23 and is pressed into contact with the upper surface of board 11 at nip 15 by the laminating roll 19. An upper heating unit 17 of conventional design directs heat into the nip 15 causing the surface of the board to soften and become adherent. In similar fashion, a continuous sheet 22 of laminating material is unwound from lower supply roll 24 and is adhered to the lower surface of the board at the nip 16 due to the combined action of heater 18 and laminating roll 20. The laminating materials 21 and 22 may be of the same or different flexible sheet material, for instance, Kraft paper, metallic foil, a fabric web or a cellular or non-cellular polymeric film. The thus laminated board is drawn from the laminating area by a pair of drag rolls 25 and 26 to a shaping area where the desired shaping is performed.

FIG. 1 shows the formation of a groove or "dado" in the side of the board according to a preferred method of the invention. Spaced rotating circular knives 27 and 28 form two parallel slits in the side of the board. The knives have a smooth, continuous edge and thus slice rather than saw the board. Thereafter, a heated tool 29, the configuration of which is best shown in FIG. 3, removes the stock material from between the two slits in the form of a continuous strip 38. Tool 29 has a rectangular, flat bottom surface, the lead or cutting edge 39 being tapered as shown in FIG. 3, that is, is sharpened on the inside of the tool. The width of the tool corresponds to the width of the groove to be made in the side of the board. The tool is heated by means of a conventional element or cartridge located in the rearward end of the tool. The temperature of the tool is regulated by control means 30 shown in FIG. 1. The tool has upstanding lateral side walls 33 and 40 configured as shown in FIG. 3.

As is best shown in FIG. 2, the heated tool edge 39 contacts the board and the material is simultaneously softened or melted and sliced by the tool. The continuous strip 38 produced is pushed outward from the board due to the angle of the edge 39 and the upstanding side walls 33 and 40 of the tool. The combined use of the spaced knives to make the longitudinal slices and the heated tool to scoop or remove the stock permits close control of the dimensions of the groove. The side walls of the groove are smooth and straight. The bottom wall of the groove is also smooth and has a somewhat "glazed" surface due to the heating action of the tool edge.

Figure 4:
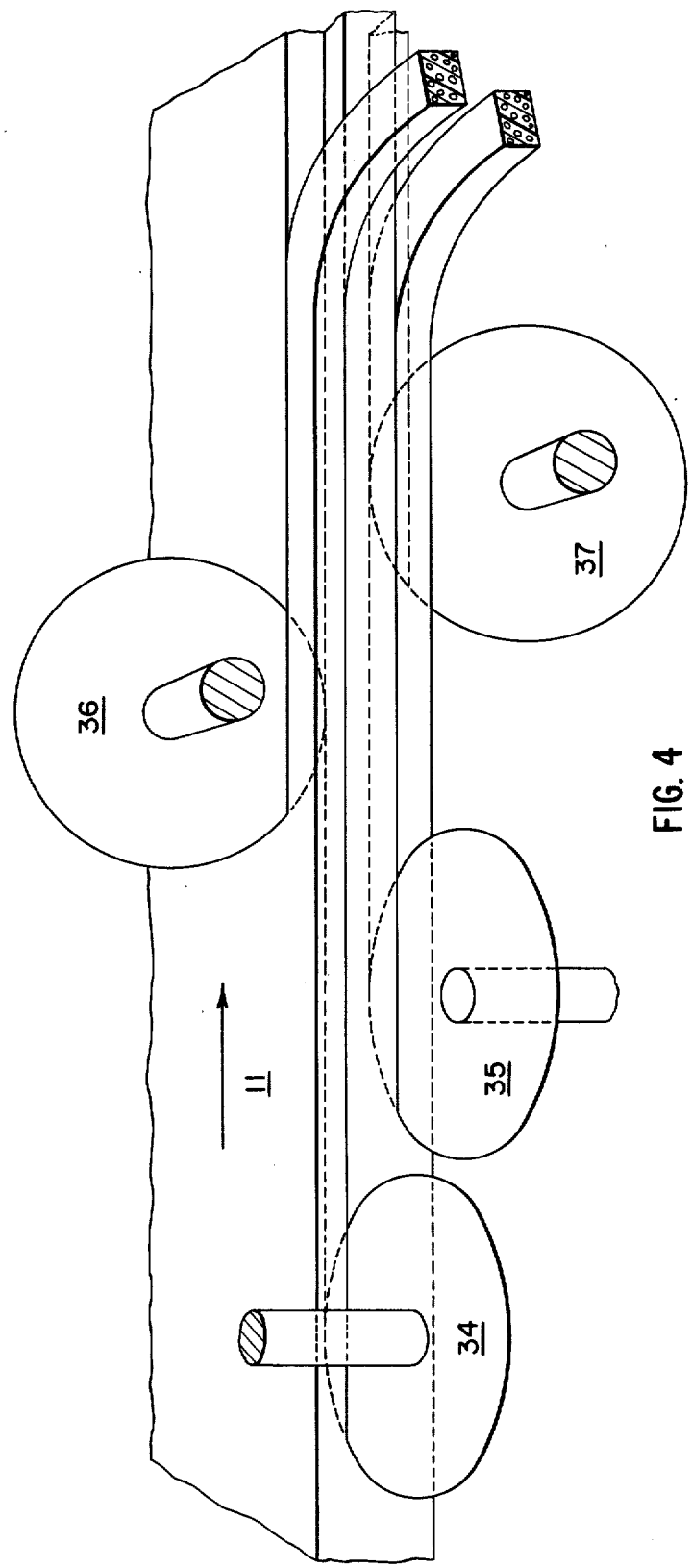
FIG. 4 is a detail, in perspective view, of the formation of a "tongue" in an insulation board according to an embodiment of the invention.

FIG. 4 illustrates one manner of forming a "tongue" in the side edge of the board. Little or no polymeric particles or "dust" are produced using this method wherein two pairs of the rotating, smooth-edged knives are employed to cut the board. Blades 34 and 36 produce intersecting longitudinal slices in the side and upper surfaces, respectively, of the board to form the upper "rabbet" portion of the tongue. Blades 35 and 37 produce intersecting slices in the side and lower surfaces, respectively, of the board and form the lower "rabbet" portion of the tongue.

The temperatures employed at the laminating areas and the temperature of the lead edge of the tool, will of course depend upon the particular polymeric resin making up the board. Polystyrene softens in the temperature range of from about 190° to 230°F. and thus the temperature maintained at the nips 15 and 16 shown in FIG. 1 and the temperature of the lead edge of tool 29 should be at least within this range when foamed polystyrene insulation board is employed.

It is claimed:

1. An apparatus for the production of a continuous length of grooved, laminated, foamed thermoplastic resin insulation board from discontinuous lengths thereof, said apparatus comprising a frame; means supported by said frame for moving said board relative to said frame; means for laminating a continuous sheet of flexible material to the upper surface of said board; means for laminating a continuous sheet of flexible material to the lower surface of said board; a pair of spaced, rotatable, smooth-edged circular knives positioned to form two spaced continuous slits in a surface of said board; a tool positioned to work between said slits and to remove resinous board material from therebetween and thereby form a groove in said board, said tool having a flat, elongated rectangular bottom having a chisel-shaped leading knife edge tapered on one side to direct board material away from said board and a width corresponding to the distance between said knives, said tool further having upstanding side walls rearward of said leading edge and perpendicular to said bottom; and means to heat said tool to at least the softening temperature of the resinous board.

2. The apparatus of claim 1 wherein the means for moving said board relative to said frame comprises a plurality of rollers.

3. The apparatus of claim 1 wherein said laminating means comprises a heater adapted to soften the surface of said board in combination with a roller for urging said flexible material into contact with said surface while in the softened state.

* * * * *